United States Patent [19]

Jellinek et al.

[11] Patent Number: 4,839,229

[45] Date of Patent: Jun. 13, 1989

[54] COMPOSITE MATERIALS OF MULTILAYER DUROPLASTIC PREPREGS

[75] Inventors: Karl Jellinek, Iserlohn-Letmathe; Bert Meier, Wesel; Jürgen Zehrfeld, Voerde, all of Fed. Rep. of Germany

[73] Assignee: Rutgerswerke AG, Fed. Rep. of Germany

[21] Appl. No.: 31,232

[22] Filed: Mar. 26, 1987

[30] Foreign Application Priority Data

Apr. 25, 1986 [DE] Fed. Rep. of Germany ....... 3613990

[51] Int. Cl.$^4$ ........................ B32B 27/38; B32B 27/42; B32B 7/00
[52] U.S. Cl. .................................. 428/413; 428/245; 428/260; 428/261; 428/272; 428/273; 428/361; 428/375; 428/378; 428/524; 428/312.8; 156/288
[58] Field of Search ............... 428/245, 260, 261, 413, 428/524, 272, 273, 375, 378

[56] References Cited

FOREIGN PATENT DOCUMENTS 0192732 10/1985 Japan ................................. 428/413
1078842 4/1986 Japan ................................. 428/413

*Primary Examiner*—P. C. Ives
*Attorney, Agent, or Firm*—Bierman and Muserlian

[57] ABSTRACT

In a composite produced by hot pressing multilayer duroplastic prepregs of reinforcing materials impregnated with a duroplastic resin system, the improvement comprising at least one layer of an epoxy resin prepreg and at least one layer of a phenolic resin prepreg are pressed together, the composite having low fume density, increased non-flammability and good solvent and moisture resistance useful for production of structural components.

6 Claims, No Drawings

COMPOSITE MATERIALS OF MULTILAYER DUROPLASTIC PREPREGS

STATE OF THE ART

Duroplastic composite materials are known and they play a prominent role in the production of structural components used, for instance, in sandwich structural components used in the aeronautical and space industry as well as in the automobile and transportation industry to save energy, to improve mechanical properties and to meet increased demands of traffic safety regulations. The composites consist of several layers of resin-impregnated reinforcing materials, so-called prepregs, which are formed into a single unit by press curing. High demands are placed on the properties of these composites wiht respect to strength, resistance to solvents and aging, and weathering resistance. In particular, a high degree of resistance against warm moisture, increased non-flammability and low fume density are demanded now.

By varying the reinforcement materials used and utilizing differing matrix materials, a large number of different composites have been prepared, each having some advantageous properties (Encyclopedia of Polymer Science and Engineering, Second Edition, Volume 3 (1985), pp- 776). However, until now, no composite was known whose property profile fulfilled all of the above mentioned requirements. High-quality composite have primarily been based on duroplastic synthetics, preferably epoxy resins, as the matrix material since epoxy resins have excellent strength, good adherency on all fibers or tissues customarily used in high-grade composites and a low degree of shrinkage during curing compared to polyesters or phenol resins. However, the disadvantage of such epoxy resin composites is their considerable moisture absorption and water vapor diffusion as well as the behavior in fire, especially the realtively high fume density and the toxicity of the fumes.

Phenol resins as matrix material generally have lower mechanical capabilities than the epoxy resins but lower moisture absorption and water vapor diffusion, particularly in warm humidity and they exhibit especially more favorable behavior in fire and lower fume density of correspondingly lower toxicity. For this reason, epoxy resins and phenol resins in combination have already been used for circuit boards for printed circuits with improved properties.

These composites have been obtained either by impregnating the reinforcement materials with a mixture of epoxy resins and phenol resins and, if necessary, another polymer as know from, for instance, JP No. 60/18531 A2 (C.A., Vol. 103: 7433 x) or by impregnating the reinforcement material first with one resin system and then with another resin system as disclosed, for instance, in JP No. 60/189987 A2 (C.A., Vol. 104: 51808 t). By using combinations of epoxy and phenol resins in this manner, the fume density of the resulting composite materials is, however, not lowered. Likewise, the improvement of moisture absorption refers only to that in cold moisture and the problem of the so-called hot-wet resistance, the resistance against warm moisture, is not solved in this way.

OBJECTS OF THE INVENTION

It is an object of the invention to provide novel composites having low fume density, low degree of flammability and good solvent and moisture resistance and a method of preparing the same.

It is further object of the invention to provide lightweight structural elements for space, aircraft and automobile industries as well as other industries.

These and other objects and advantages of the invention will become obvious from the following detailed description.

THE INVENTION

The novel composites of the invention are produced by hot pressing multilayer duroplastic prepregs of reinforcing materials impregnated one layer of an epoxy resin prepreg and at least one layer of a phenolic resin prepreg are pressed together. The composites have an absolutely homogeneous bond between two prepregs and exhibit excellent strength which is unexpected. One skilled in the art would expect disturbances in the bonding resulting in imparied strength in the boundary surfaces between the different prepregs due to known differences in shrinkage of the matrix resins during curing and the different curing mechanisms. The phenolic resins are preferably novolac resins with a curing agent of hexamethylenetetramine or a reaction product of formaldehdye and a nitrogen base.

In addition, one skilled in the art would expect that mixtures of epoxy resin-curing agent-catalyst systems and phenol resin-curing agent-catalyst systems would not cure to a homogenous, high-molecular network on the interface of the different pre-impregnated web layers due to certain competitive reactions and pronounced polymer intolerance. Thus, pressing of fiber reinforced epoxy resin prepregs with fiber reinforced prepregs impregnated with phenolic resin because of intolerance and competitive reactions would not be expected to result in intimate bonding but in bonds containing bubbles with low interlaminer shear strength and poor layer bonding.

Furthermore, the composites of epoxy resin prepregs and novolac prepregs of the invention have improved properties if they are formed so that the epoxy prepregs are between novolac prepregs so that the novolac prepregs always form the upper and the lower outer layers. Such composites have a low degree of flammability, have a surprisingly low fume density and, equally surprising, excellent resistance against warm moisture. Since they additionally posses good resistance against weathering, aging and chemicals, they exhibit a total property profile which fulfills all the requirements mentioned above.

Suitable epoxy resin systems for the composites of the invention are all epoxy resins based on reaction products of epichlorohydrin with bisphenol A, bisphenol F, higher functional novolacs of phenol, cresols, xylenols and longer chain alkyl phenols such as p-tertiary-butyl phenol or nonyl phenol, with tris-1,3,3-hydroxyphenylpropane, tetrakishydroxyphenylethane, resorcin, hydroquinone, catechol, phloroglucinol, pyrrogallol, tris-1,1,1-(hydroxyphenyl)methane and o-, m-, p-aminophenol.

Examples of curing agents usual in epoxy resin prepreg production are dicyandiamide, guanidine, guanamine, guanamide, diaminodiphenylsulfone, diaminodiphenylmethane, m-phenylenediamine and 1,3-propylene-bis-(4-aminobenzoate) together with catalysts such as benzyldimethylamine or imidazole derivatives.

Examples of suitable, phenolic resin systems for the composites of the invention are phenol novolac resins with hexamethylenettetramine or reaction products of formaldehyde with nitrogen bases as the curing agent. The preferred curing agent is hexamethylenetetramine. Suitable phenol novolac resins are all condensation polymers condensed from phenol, cresols, xylenols and alkyl phenols with formaldehyde in a mole ratio of 1:0.25 to 1:0.98 using acidic catalysts such as hydrochloric acid, sulfuric acid, phosphoric acid as well as organic acids like oxalic acid, maleic acid and fumaric acid. The novolac resins have median molecular weights from 200 to 2000, preferably 300 to 1000.

Curing agents and catalysts suitable for novolac resin curing and for the chemical cross linkage with the epoxy prepreg systems are preferably hexamethylenetetramine or reaction products of formaldehyde and nitrogen bases, for example, anhydroformaldehyde-aniline or similar Schiff's bases. Addition of hexamethylenetetramine or of the said Schiff's bases is preferably in the range of 2 to 18% by weight.

The values of the mechanical properties of the fiber composite materials can be further improved, especially the flexibility of the matrix if compatible synthetic rubber, for example butadiene polyacrylonitrile rubber, polyacrylelastomers, preferably with reactive end groups or thermoplastic impact resistance increasing agents such as polyesters, polyacrylates, polyamides, polysulfones, polyethersulfones, polyetherimides or polyetherketones are added in amounts of 2 to 20% by weight.

Reinforcing support materials are loose fiber mixtures, fiber matting or fiber fleece as well as webs or rovings based on high-quality fiber raw material like, for instance, glass, ceramic, boron, carbon, aramide or phenol resin fibers. The reinforcing materials are impregnated with the resin systems in a manner known per se either by impregnation or by coating with liquid resin systems or with solutions of solid resin systems with subsequent evaporation of the solvents.

While webs coated with customary phenol resols exhibit a high degree of brittleness and rigidity as well as melt properties which do not permit processing together with epoxy adhesive prepregs into molded structural components, the phenolic resin prepregs of the invention have good drapability at room temperature. They can be placed together as planar sheets with appropriate prepregs of the same of different resin type or with other resin types of the same or different reinforcing materials and pressed at higher temperatures and under the usual pressures for 30 minutes to form high-quality composites.

The temperature for pressing is selected so that it is above, preferably 10° to 20° C. above the curing temperature of the resin system with the highest curing temperature. Depending on the resin system, pressing temperatures in the range of 80° to 250° C. may be used. The resulting composites have excellent mechanical and interlaminar shear strength as well as high layer bonding previously unattainable and extraordinary good resistance against the effects of moisture and heat.

The composites produced according to the invention by cover pressing of epoxy resin and novolac resin prepregs can be used either directly as structural components in the aeronautical and space industry as well as the automobile and transportation industry or they can also be used in combination with light-weight materials like aluminum or Nomex honeycomb elements for the production of composite structural elements (sandwich structural components). In these core constructions as applied to honeycomb cores, the epoxy resin prepregs are placed facing the honeycomb to ensure good bonding to the honeycomb through controlled meniscus formation. One or more phenolic resin prepregs are then placed on the plane surfaces. The simple composites as well as the core constructions exhibit lower water absorption than the composite based on epoxy resin prepregs along and a surprisingly high degree of wet-hot resistance not attained previously by epoxy resins or phenol resins.

In the following examples are described several preferred embodiments to illustrate the invention. However, it should be understood that the invention is not intended to be limited to the specific embodiments.

EXAMPLE 1

33.4 g of hexamethylenetetramine were added to 350 g of a 70% methanolic solution of a novolac wiht a phenol-formaldehyde molar ratio of 1:0.85 and a web of glass or carbon fibers was impregnated with the mixture to the point of saturation. The resulting web was dried for approximately five minutes in an airstream at 105° to 115° C. to obtain a prepreg with a 45 to 50% resin content, a 25 to 35% flow (measured by German Airbus Standard DAN 406) and a 4 to 6% content of volatile components.

A sandwich of a commercial epoxy resin prepreg based on a modified bisphenol A/Bisphenol F - epoxy resin [Rutapox R 0146/LS 82 (curing agent-dicyandiamide)]with a viscosity of 650 mPas at 25° C. a solids content of 74% with the previously made prepregs on the top and bottom thereof were pressed together at 55° C. for 30 minutes. Heating of the press from room temperature to press temperature took more than 40 minutes.

EXAMPLE 2

Glass web prepregs weighing 286 g/m$^2$ each were used to prepare a composite with three layers containing the phenolic resin of Example 1, then two layers of the epoxy prepreg of Example 1 and three layers of the phenolic resin of Example 1 were pressed at 155° C. and a pressure of 0.1 to 0.5 N/mm$^2$ (1 to 5 bar) for 30 minutes and the resulting composite of 2 mm thickness had the following mechanical properties'.

|  | Temperature Measured | Unit | Value | H$_2$O Absorption |
| --- | --- | --- | --- | --- |
| Flexural strength | RT | N/mm$^2$ | 650 | — |
|  | 50° C. | N/mm$^2$ | 645 | — |
|  | 80° C. | N/mm$^2$ | 410 | — |
| Flexural strength after conditioning: |  |  |  |  |
| 1 hour in H$_2$O 100° C. | 50° C. | N/mm$^2$ | 530 | 0.19% |
| 4 hours in H$_2$O 80° C. | 50° C. | N/mm$^2$ | 540 | 0.19% |

-continued

|  | Temperature Measured | Unit | Value | H$_2$O Absorption |
|---|---|---|---|---|
| 8 hours in H$_2$O 80° C. | 50° C. | N/mm$^2$ | 540 | 0.24% |

EXAMPLE 3

A 2 mm thick composite plate produced from 2 layers of phenolic resin prepreg of Example 1 3 layers of epoxy resin prepreg of Example 1, and then 2 layers phenolic resin prepreg, each on a carbon fiber web with a basis weight of 245 g/m$^2$ was pressed at a pressure of 0.1 to 0.5 N/mm$^2$ (1 to 5 bar) at 155° C. for 30 minutes and the composite had the following mechanical values as a function of temperature and immersion in hot water:

|  | Temperature measured in Unit |  | Value | H$_2$O Absorp. |
|---|---|---|---|---|
| Flexural strength | RT | N/mm$^2$ | 680 | — |
|  | 50° C. | N/mm$^2$ | 650 | — |
|  | 80° C. | N/mm$^2$ | 530 | — |
| Interlaminar | RT | N/mm$^2$ | 56 | — |
| shearing strength | 50° C. | N/mm$^2$ | 51 | — |
|  | 80° C. | N/mm$^2$ | 35 | — |
| Flexural strength after conditioning |  |  |  |  |
| 1 hour in H$_2$O 100° C. | 80° C. | N/mm$^2$ | 435 | 0.39% |
| 4 hours in H$_2$O 80° C. | 80° C. | N/mm$^2$ | 499 | 0.40% |
| 8 hours in H$_2$O 80° C. | 80° C. | N/mm$^2$ | 436 | 0.54% |

EXAMPLE 4

Prepreg combinations of Example 1, 2 and 3 were applied onto aluminum honeycombs to produce sandwich structural components and were pressed into low fume and water resistant core composite structural components. Measurement of the fume density took place by ATS 1000.001 and yielded the following values:

|  | Fume densities DS | |
|---|---|---|
| Measurement | Cover pressed Sandwich laminate | Comparison: conventional, pure epoxy resin laminate |
| after 1.5 min | 30 | 250–300 |
| after 4.0 min | 130 | 500–600 |

Various modifications of the composites and method of the invention may be made without departing from the spirit or scope thereof and it is to be understood that the invention is intended to be limited only as defined in the appended claims.

What we claim is:

1. A composite produced by hot pressing multilayer duroplastic prepregs of reinforcing materials impregnated with a duroplastic resin systems, the improvement comprising at least one layer of an epoxy resin prepreg and at least one layer of a phenolic resin prepreg are hot pressed together to cure the resins and bond the layers to each other.

2. A composite of claim 1 wherein at least one epoxy resin prepreg is pressed between at least two phenolic resin prepregs.

3. A composite of claim 1 wherein at least one of the epoxy resin and the phenolic resin systems is modified by the addition of 2 to 20% by weight of a compatible rubber or thermoplastic polymer.

4. A composite of claim 1 wherein the phenolic resin system contains a curing agent selected from the group consisting of hexamethylenetatramine and reaction products of formaldehyde and nitrogen bases.

5. A composite of claim 1 wherein the phenolic resin has a molecular weight of 300 to 1000.

6. A composite of claim 2 wherein at least one of the epoxy resin and the phenolic resin systems is modified by the addition of 2 to 20% by weight of a compatible rubber or thermoplastic polymer.

* * * * *